Figure 1:
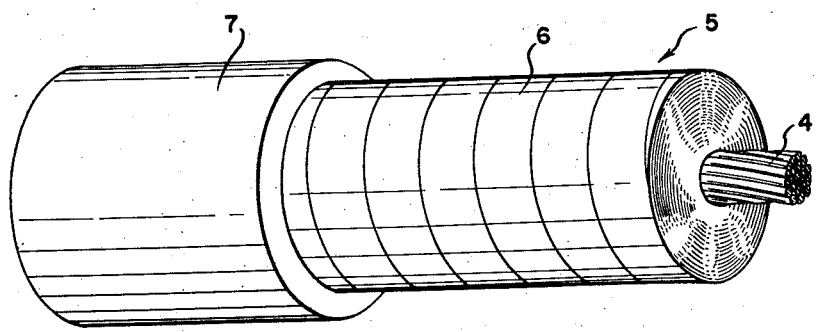

Feb. 12, 1963  W. F. OLDS  3,077,510
HIGH VOLTAGE POWER CABLE
Filed June 2, 1959

INVENTOR
Walter F. Olds
BY
*Pennie Edmonds Morton Barrows & Taylor*
ATTORNEYS

_United States Patent Office_

3,077,510
Patented Feb. 12, 1963

3,077,510
HIGH VOLTAGE POWER CABLE
Walter F. Olds, Arlington, Mass., assignor, by mesne assignments, to Anaconda Wire and Cable Company, Hastings on Hudson, N.Y., a corporation of Delaware
Filed June 2, 1959, Ser. No. 817,633
1 Claim. (Cl. 174—25)

This invention relates to electric power cables and, more particularly, to power cables having a metallic conductor surrounded by a permeable layer of polyethylene insulation which is impregnated with a dielectric fluid. It is a particular object of the invention to minimize any swelling or softening of the polyethylene insulation due to the solvating effects of the dielectric fluid. To this end, the interstices of the polyethylene insulation in the new cable are impregnated with a fluid organosilicon polymer in which polyethylene is insoluble, thereby precluding any tendency of the polyethylene insulation to undergo swelling or softening on prolonged operation of the cable. The electric power cable of the invention may be operated at high voltages and over sustained periods of time without risk or danger to the polyethylene insulation.

Polyethylene is a semirigid, waxy, translucent, synthetic resin having excellent dielectric properties, ozone resistance, moisture resistance, and chemical stability. Although it has been used extensively to insulate low voltage conductors and conductors which carry small high frequency currents, it has been difficult to apply it to high voltage power cables which carry relatively large currents. For example, it has long been known that if polyethylene tape were used to replace the paper wrapping employed in conventional oil-impregnated high voltage power cables, the lower dielectric constant of polyethylene would permit a higher maximum working voltage than do paper tapes for a given thickness of insulation. In such cables, the conductor or conductors might be covered with layers of helically wrapped polyethylene tape which is specially formed to permit easy penetration of a cable oil between successive turns of the wrappings.

Because of the pronounced solvating effect exerted by hydrocarbon cable oils on polyethylene, the effects of which become even more pronounced at temperatures approaching the softening point of polyethylene, the use of such oil-impregnated polyethylene-insulated power cables has been severely limited by the tendency of the polyethylene insulation to swell or undergo softening during prolonged operation of the cable. When, however, the polyethylene insulation is impregnated with a fluid organosilicon polymer in which polyethylene is insoluble, this tendency is quite completely obviated. Moreover, by using a fluid organosilicon polymer to impregnate the interstices of polyethylene wrapping, it is possible to minimize the formation of any electrical stresses in the cable insulation, since the dielectric constants of these organosilicon polymers is very often substantially the same as that of the polyethylene insulation.

Accordingly, a cable of the character contemplated by this invention comprises a metallic conductor surrounded by insulation comprising a fluid-permeable solid layer of polyethylene and a fluid organosilicon polymer in which polyethylene is insolubly impregnated into and filling the pores and interstices of said wrapping. The organosilicon polymer preferably is one selected from the group consisting of polysiloxanes, polysilanes, and polysilicate esters and should have a low dielectric constant and a high specific resistivity. The dimethyl polysiloxane fluids are particularly satisfactory impregnants. A protective sheath advantageously surrounds the insulation.

The polyethylene insulation must be thoroughly impregnated with the fluid organosilicon polymer, without entrapment of any air bubbles in the wrappings, for air bubbles are focal points for ionization and electrical failure of the cable. To thoroughly and completely impregnate the polyethylene insulation with the dielectric fluid, the layer of polyethylene insulation about the conductor should be fluid permeable. It may, for example, be formed of wrappings comprising porous polyethylene tapes or wrappings of impermeable polyethylene tape formed with or combined with other materials to provide a sufficient number of fluid-permeable channels so that the fluid organosilicon polymer can penetrate through successive layers of the wrappings and completely permeate all interstices of the polyethylene insulation. Porous tapes may be prepared from a coherent porous mat of polyethylene fibers or a coherent porous "felt" of sintered polyethylene powder, the degree of porosity in each case being determined respectively by the relative size and length of the polyethylene fibers or the particle size of the polyethylene powder. Where an impervious sheet or film of polyethylene is used to form the tape, it should have a multiplicity of fluid-permeable channels provided on at least one side, extending across the face of the tape from edge to edge, to permit easy penetration of the fluid organosilicon polymer between successive layers of the wrappings. Such channels may be provided by forming them directly in one face of the impermeable tape or by laminating the impermeable tape to a permeable facing layer.

Any fluid organosilicon polymer may be used to impregnate the polyethylene insulation in a high voltage power cable in accordance with the invention. Polyethylene is sufficiently insoluble in all such polymers, and all of them possess a sufficiently low dielectric constant and sufficiently high specific resistivity to be advantageous. Particularly satisfactory results have been obtained, however, by using those polysiloxanes, polysilanols, and polysilicate esters in which the ratio of silicon and oxygen to the hydrocarbon moiety is such that the polymers have virtually no solvating effect on the polyethylene molecule. Of these silicone polymers, the fluid polysiloxanes in particular may be singled out for special mention, since their dielectric constants are often so nearly identical to the dielectric constants of the low molecular weight polyethylenes from which the tapes are generally formed that it is possible to obtain a polysiloxane-impregnated polyethylene insulation which is considerably more electrically homogeneous than polyethylene insulation impregnated with other fluid dielectric.

These fluid polysiloxanes, of which the dimethylpolysiloxanes are representative compounds, usually possess a viscosity, at 25° C., between 0.6 and 30,000 centistokes, and a dielectric constant from about 2.2 to about 2.8. Both the viscosity and the dielectric constant of the polymer generally increase with an increase in its molecular weight. The methyl groups of the dimethylpolysiloxanes may be replaced in part by various other organic radicals, such as phenyl groups, provided that the number and position of these radicals do not introduce an oleophilic segment into the polysiloxane molecule. All of these polysiloxane fluids possess excellent physical, chemical and electrical properties as fluid impregnants for permeable polyethylene insulation in high voltage power cables, since they exhibit complete inertness to polyethylene and exert no solvating effect on the polyethylene.

Figure 2:
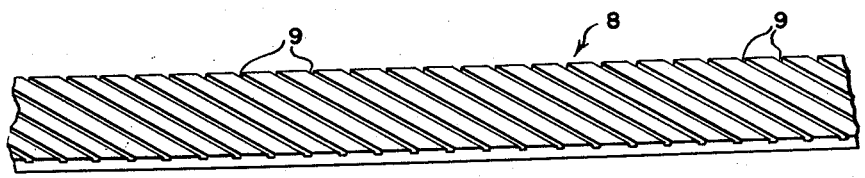
Figure 3:
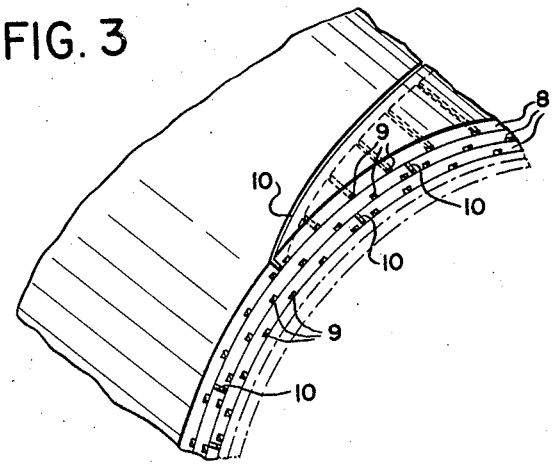

To illustrate the applicability of impregnating the polyethylene insulation of a high voltage power cable with a fluid organosilicon polymer in accordance with the invention, two preferred embodiments are described below with reference to the accompanying drawing, in which FIG. 1 is a perspective view of a single conductor power cable in which the conductor is covered by a solid layer comprising porous polyethylene tape impregnated with a fluid organosilicon polymer;

FIG. 2 is a perspective view of a length of solid polyethylene tape having transverse grooves formed on one face thereof; and FIG. 3 is a perspective view, on a greatly enlarged scale, of a body of conductor insulation formed of helical wrappings of polyethylene tapes of the character shown in FIG. 2.

The cable shown in FIG. 1 is a single conductor cable having a central stranded conductor 4 surrounded throughout its entire length by a porous covering 5 composed of many layers of helically wrapped polyethylene tape 6 which forms a substantially continuous concentric insulating layer about the conductor. Although a single conductor cable is shown for purposes of illustration in the accompanying drawing, it is understood that the invention is equally applicable to a cable having two or more conductors, each of which may be separately insulated by individual layers of polyethylene tape.

The polyethylene tape 6, which is freely permeable, preferably is formed from a thin, flexible sheet composed of minute, substantially discrete but coherent particles of polyethylene. It is preferably applied helically to the conductor, as shown, with its edges abutting or spaced slightly apart from, rather than overlapping, the adjoining turns. As a practical matter, however, it is frequently difficult in commercial practice to avoid occasional small overlaps of the edges of the tape.

The helically wrapped tape is impregnated throughout with a dimethylpolysiloxane liquid having a viscosity, at 25° C., in the range from 0.6 to 30,000 centistokes and a dielectric constant in the range from 2.2 to 2.8. The polysiloxane fluid is impregnated into the insulating layer by immersing the wrapped conductor in a bath of the polysiloxane in a vessel in which it can alternately be evacuated and then subjected to pressure to withdraw air and to cause the liquid to fill all voids and interstices in the porous wrapping. Thereafter a protective lead sheath 7 is extruded about the polysiloxane-impregnated wrapping throughout substantially the entire length of the cable.

Instead of using porous polyethylene tape to form the wrappings about the conductor, the polyethylene insulation may be formed from a number of layers of polyethylene tape which is impervious to the dimethylpolysiloxane fluid but which contains a number of fluid-permeable channels extending completely across its width to permit the helical wrapping to be impregnated with the fluid organosilicon polymer. Such a tape is shown in FIG. 2. It consists of a thin narrow tape 8 cut from a sheet of solid polyethylene which is impervious to the dimethylpolysiloxane fluid and is provided with a multiplicity of parallel grooves 9 extending diagonally from edge to edge across one face. The grooves 9 may have any desired cross-sectional shape but are shown as being rectangular. Their depth advantageously is about one-third the thickness of the tape 8. They are preferably formed at the same angle to the side edges of the tape as the angle of lay of the tape when it is helically wrapped about the conductor, so that in the cable insulation the channels will extend longitudinally of the cable. They may be formed in any convenient manner, such as by cutting them into an originally ungrooved polyethylene sheet, or by impressing them during fabrication of the sheet. For example, the grooves 9 may be formed as the polyethylene sheet is rolled against a heated drum which contains a number of helical ridges on its surface, whereby a permanent negative impression of the ridges is impressed into one surface of the polyethylene sheet.

A multiplicity of layers of tapes 8 illustrated in FIG. 2 are helically wrapped about a conductor to form an insulating covering thereon of the character shown in FIG. 3. The grooves 9 define a multiplicity of small fluid-permeable channels longitudinally disposed in the tape wrappings, into and through which the fluid polysiloxane impregnant may easily penetrate. The tapes are applied with their edges spaced part so that fissures 10 always exist between the abutting turns. These fissures, in cooperation with the channels, permit the dimethylpolysiloxane fluid to penetrate from layer to layer through the entire body of polyethylene insulation. Since the distance between adjacent grooves 9 is small, a film of the polysiloxane fluid also penetrates between the face-to-face surfaces of adjoining turns of tape so that all voids originally present become filled with the dielectric fluid. As a result, after the helical wrapping is thoroughly impregnated with the dimethylpolysiloxane fluid, the insulation surrounding the conductor becomes a mass of solid polyethylene and impregnant which is substantially completely free of voids.

The structures described above with reference to FIGS. 1 to 3 are merely exemplary of a variety of ways by which cable insulation composed in whole or in part of polyethylene may be rendered fluid permeable. The manner in which such result is accomplished is not part of the invention, and for purposes of the invention any fluid-permeable layer composed in whole or in substantial part of polyethylene may be employed as the solid dielectric which is impregnated with an organosilicon polymer.

The polyethylene of which the solid insulation about the conductor is formed is preferably the so-called linear or "isotactic" polyethylene. Isotactic polymers are those formed under conditions which result in a stereospecific polymerization of the monomer molecule. Such polymers possess a higher degree of crystallinity and a higher melting point than randomly polymerized compounds having the same molecular weight but a disordered structure. Although polyethylene theoretically possesses no side chains and should display no differences in properties due to steric variations, the main chains of polyethylene molecules often possess polyethylene side chains. The presence of such branched chains decreases the hardness and melting point of the polymer. As applied to polyethylene, therefore, the term "isotactic" is synonymous with "linear" and denotes the substantial absence of branched chain molecules, as a result of which a maximum melting point, hardness, degree of crystallinity, and other properties due to ordered arrangement of the polymer molecules can be attained in a mass made up of polymer molecules of given molecular weight.

These properties are advantageous because it is desirable to subject the cable prior to impregnation to a temperature as near as possible to 100° C. to drive off moisture, and because in the completed cable the insulation must be able to withstand operation at quite high temperature (up to about 85° C.) and must be resistant to creep and to deformation under pressure. Such properties generally are found in polyethylene which has been slowly cooled or annealed from the melt condition when formed, rather than cooled rapidly, to allow longitudinal orientation of the polyethylene molecules.

The polyethylene as originally formed, or the sheets, tapes, fibers, or powders produced therefrom, may be exposed to high voltage bombardment by electrons or other radiations effective to cross-link its molecules, or it may otherwise be treated to form cross-link bonds, to improve further its resistance to cold flow and to attack by the fluid organosilicon polymer used as the impregnant. The polyethylene employed to fabricate the tapes preferably has a molecular weight of upwards of 10,000 (say approximately 25,000), a melting point near or above 110° C., and a dielectric constant preferably not exceeding 2.5. Because of the low water-absorptive properties of polyethylene, the electrical properties of this material are not particularly sensitive to humidity.

In the foregoing embodiments of the invention, particular reference has been made to the use of a dimethylpolysiloxane fluid to impregnate the helical wrappings of polyethylene tape surrounding the metallic conductor. Various other fluid organosilicon polymers, such as the phenylmethylpolysiloxanes, polysilanols, or even the polysilicate esters, may also be employed as the fluid impregnant in place of or in addition to these dimethylpolysiloxanes.

Although a single conductor power cable has been illustrated, the new cable of the invention may have three, or any other desired number, conductors. Moreover, the cable structure may contain one or more electrostatic shields as well as various other cable elements which are neither shown nor described above, and may be either a fluid-filled, gas-filled, or gas-pressure type of power cable rather than the relatively simple solid type of power cable illustrated in the drawing.

I claim:

A high voltage electric power cable comprising a metallic conductor surrounded by insulation comprising a helical wrapping of polyethylene tapes laid with edges spaced slightly apart and having at least one side provided with a multiplicity of fluid-permeable channels extending thereacross from edge to edge and a dimethyl polysiloxane liquid having a viscosity, at 25° C. from 0.6 to 30,000 centistokes and a dielectric constant from about 2.2 to about 2.8 impregnated into and filling said channels and the spaces between the tapes, and a lead sheath enclosing said insulation.

References Cited in the file of this patent

UNITED STATES PATENTS

| 458,316 | Degenhardt | Aug. 25, 1891 |
| 463,107 | Degenhardt | Nov. 10, 1891 |
| 1,730,740 | Morrison | Oct. 8, 1929 |
| 2,196,026 | Piercy | Apr. 2, 1940 |
| 2,314,694 | Dodds | Mar. 23, 1943 |
| 2,377,689 | Hyde | June 5, 1945 |
| 2,454,625 | Bondon | Nov. 23, 1948 |

FOREIGN PATENTS

| 439,345 | Great Britain | Dec. 4, 1935 |
| 456,139 | Canada | Apr. 26, 1949 |
| 773,563 | Great Britain | Apr. 24, 1957 |

OTHER REFERENCES

Felten et al., German application, 1,020,075 printed November 28, 1957 (Kl. 21c 7/52).